United States Patent [19]

Koenig

[11] 4,348,062
[45] Sep. 7, 1982

[54] TRACTOR AIR BRAKE PROPORTIONING SYSTEM

[75] Inventor: James P. Koenig, Cuyahoga, Ohio

[73] Assignee: The Bendix Corporation, Southfield, Mich.

[21] Appl. No.: 178,225

[22] Filed: Aug. 14, 1980

[51] Int. Cl.³ .......................... B60T 8/18; B60T 8/26
[52] U.S. Cl. ....................................... 303/6 C; 303/7; 303/13
[58] Field of Search .................. 303/6 C, 7, 6 A, 6 M, 303/9, 13, 71, 28–30, 40; 188/349, 3 R

[56] References Cited

U.S. PATENT DOCUMENTS

| | | | |
|---|---|---|---|
| 3,190,700 | 6/1965 | Fites | 303/7 X |
| 3,492,052 | 1/1970 | Klimek | 303/6 C |
| 3,957,315 | 5/1976 | Cummins et al. | 303/7 X |
| 4,230,373 | 10/1980 | Plantan | 303/7 |

Primary Examiner—Douglas C. Butler
Attorney, Agent, or Firm—Ken C. Decker; William N. Antonis

[57] ABSTRACT

A fluid pressure braking system for an articlated vehicle having a towed unit and a towing unit includes a source of fluid pressure carried on the towing unit and a supply line (68) and a service line (70) which communicates the braking system on the towing unit with the braking system on the towed unit. A proportioning valve (36) controls communication to the relay valve (42) which communicates braking pressure to the rear wheel service brakes of the towing unit. The proportioning valve (36) is connected through a control port (82) to an inversion valve (76). The inversion valve (76) is responsive to fluid pressure in the supply line (68) to communicate a pressure signal to the control port (82) when the pressure level in the supply line (68) drops below a predetermined level. The proportioning valve (36) is responsive to the pressure signal on the control port (82) to proportion communication to the control port of the relay valve (42). Accordingly, when the pressure level in the supply line (68) drops below the predetermined level, which indicates that the towed unit has been disconnected from the towing unit, the proportioning valve (36) cuts down on the braking pressure communicated to the rear wheel brakes of the towing unit. On the other hand, when the pressure in the supply line (68) is above the predetermined level, thereby indicating that the towing unit and towed unit are connected, the proportioning valve (36) permits substantially uninhibited communication to the relay valve (42).

2 Claims, 4 Drawing Figures

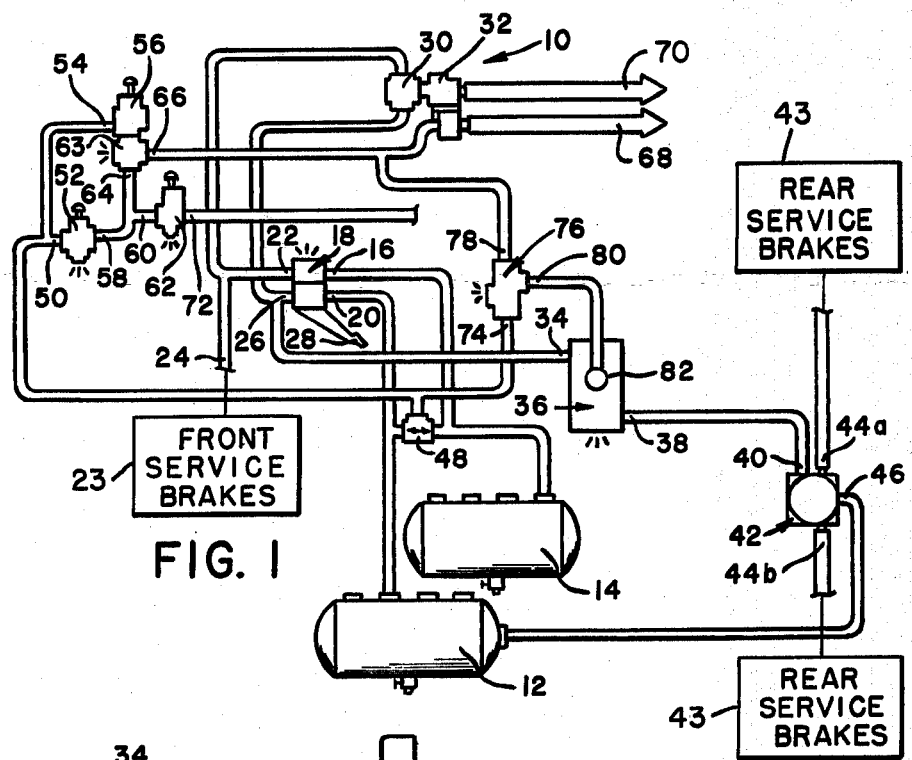
FIG. 1
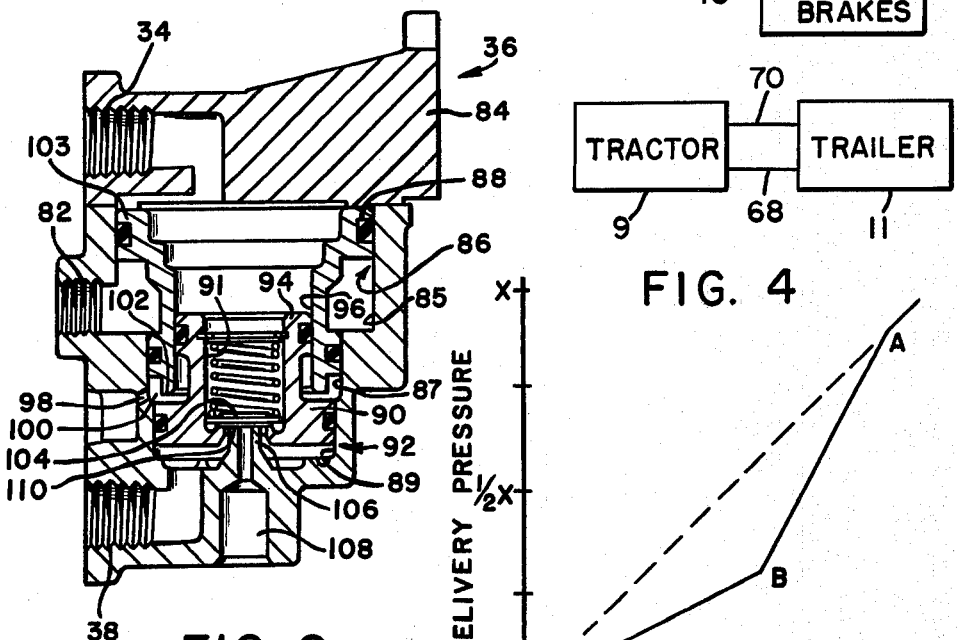
FIG. 2
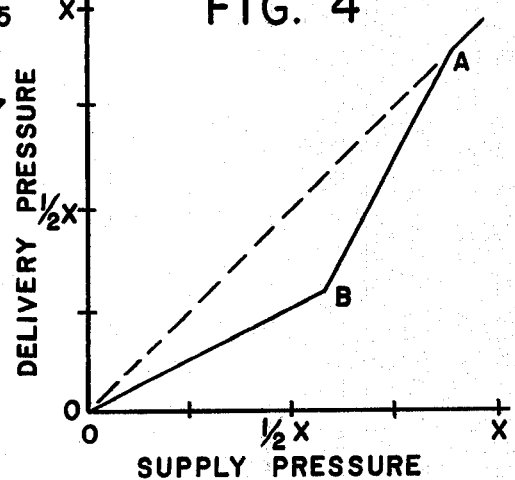
FIG. 4
FIG. 3

TRACTOR AIR BRAKE PROPORTIONING SYSTEM

This invention relates to a fluid pressure braking system for an articulated vehicle.

Prior art fluid pressure braking systems for articulated vehicles comprising a tractor/trailer combination include a source of fluid pressure which is carried by the tractor, and a supply line which interconnects the tractor with the trailer for communicating fluid pressure from the tractor to the trailer when the tractor and trailer are connected. The supply line is maintained at a predetermined pressure level by the fluid pressure source when the tractor is connected to the trailer and the supply line is connected to the braking system on the trailer. However, the supply line is vented to atmosphere when the trailer is disconnected from the tractor. The tractor also includes front and rear service brakes and a service brake actuating system which communicates substantially the same fluid pressure levels to the front and rear service brakes both when the tractor is connected to the trailer and when the tractor is operated without a trailer.

This type of prior art braking system has the disadvantage in that, as discussed hereinabove, the same pressure level is transmitted to the rear service brakes of the tractor regardless of whether or not the tractor is pulling a trailer. However, the weight borne by the rear axle of the tractor is quite different in these situations, since a very large part of the weight carried in the trailer is borne by the rear wheels of the tractor when the tractor pulls a trailer. However, when the tractor is operated alone, the rear axle thereof bears very little weight. Accordingly, if the same pressure level is communicated to the rear wheel brakes regardless of whether the rear axle is heavily loaded or is unloaded, the rear service brakes will tend to lock very quickly when the tractor is operated without its trailer, thereby causing a dangerous skidding condition.

Accordingly, the present invention provides a proportioning valve in the brake line communicated to the rear service brakes on the tractor. The proportioning valve has an inlet connected in the service braking system of the tractor, and is responsive to the pressure level in the supply line for communicating a pressure level to the rear service brakes of the tractor that is less than the pressure level communicated to the inlet over at least a portion of the range of actuating pressures in the service brake system when the pressure level in the supply line is below the predetermined level. However, the proportioning valve communicates substantially the same pressure level to the rear service brakes of the tractor as is the pressure level communicated to the inlet of the proportioning valve when the pressure level in the supply line is above the predetermined level as is the case when the tractor is connected to the trailer. In this way, a proportioned brake pressure level is communicated to the rear service brakes when the trailer is disconnected from the tractor, but an unproportioned brake pressure level is communicated to the rear service brakes when the tractor pulls a trailer.

Accordingly, the invention has the advantage of providing a reduced actuating pressure to the rear wheel service brakes when the tractor is operated without its trailer, yet which automatically provides the necessary unproportioned or unreduced brake pressure to the rear service brakes when the tractor is connected to the trailer. In this way, dangerous skidding conditions are avoided when the tractor is operated without the trailer.

This and other advantages of the present invention will be made apparent in the following description with reference to the accompanying drawings, in which:

FIG. 1 is a schematic illustration of a braking system made pursuant to the teachings of my present invention, in which conventional portions of the system which do not relate to the invention are omitted for clarity;

FIG. 2 is an axial cross-sectional view of a proportioning valve used in the system illustrated in FIG. 1; and FIG. 3 is a graphical illustration of the operation of the valve illustrated in FIG. 2.

FIG. 4 is a diagrammatic illustration of a tractor-trailer combination vehicle.

Referring now to the drawings, the tractor portion of a fluid pressure braking system for a combination vehicle having a tractor or towing unit 9 and a trailer or towed unit 11 is generally indicated by the numeral 10. Braking system 10 includes a rear axle service reservoir 12 and a front axle service reservoir 14. Reservoirs 12 and 14 are charged by the conventional automotive air compressor (not shown) which is operated by the vehicle engine. The front axle service reservoir 14 is communicated to an inlet 16 of a dual brake valve generally indicated by the numeral 18. Similarly, the rear axle service reservoir 12 is communicated to the other inlet port 20 of the dual brake valve 18. When a brake application is effected, the dual brake valve 18 communicates the inlet port 16 with the outlet port 22, which is communicated to the front wheel service brakes 23 through brake line 24, and communicates the inlet port 20 to the outlet port 26. Dual brake valve 18 is conventional, and is operated by the vehicle operator when a brake application is effected by manipulation of the vehicle brake pedal 28.

Outlet port 22 is also communicated to one side of a dual check valve 30, the other side of dual check valve 30 being communicated to the outlet port 26. Dual check valve 30 communicates the higher of the two pressure levels at the ports 22, 26 to the inlet port of a conventional tractor protection valve 32. Tractor protection valve 32 is conventional, having been manufactured by the assignee of the present invention for many years. Outlet port 26 is also communicated with a supply port 34 of a brake proportioning valve generally indicated by the numeral 36. Brake proportioning valve 36 is illustrated in FIG. 2 hereof, and will be described in detail hereinafter. The delivery port 38 of the proportioning valve 36 is connected to the control port 40 of a relay valve 42 which controls communication to the rear wheel service brakes 43 through delivery ports 44a, 44b. The supply port 46 of relay valve 42 is communicated to the rear axle service reservoir 12. Relay valve 42 is conventional, and is effective upon communication of a control signal to the control port 40 to communicate the supply port 46 with the delivery ports 44a, 44b to thereby effect a rear service brake actuation.

The rear axle and front axle service reservoirs 12, 14 are also connected through a dual check valve 48 to the supply port 50 of a push-pull system park valve 52 and to the supply port 54 of a push-pull trailer supply valve 56. Valves 52, 56 are conventional, and will not be described in further detail herein. The delivery port 58 of valve 52 is communicated to the supply port 60 of push-pull tractor park valve 62, which is identical to valve 52, and to the control port 64 of the valve 56. Valve 56 operates in a similar fashion to the valves 52 and 62, that is, manual manipulation of the valves 52, 56 and 62 either communicates the supply ports with the delivery ports thereof or vents the delivery ports to atmosphere and closes the supply ports. However, valve 56 is provided with an auxiliary section 63 such that in the absence of a pressure signal to the control port 64, the valve 56 automatically moves to a position closing the supply port and venting the delivery port. The delivery port 66 of valve 56 is communicated through the tractor protection valve 32 to the trailer supply line 68. The trailer service line 70 is also connected through the tractor protection valve 32 and communicates with the dual check valve 30 when the tractor protection valve is opened, as occurs when the trailer is coupled to the tractor and valves 52 and 56 are actuated. The delivery port 72 of valve 62 is communicated to the parking brakes of the tractor (not shown).

The outlet of the dual check valve 48 is also communicated to the supply port 74 of an inversion valve generally indicated by the numeral 76. The control port 78 of the inversion valve 76 is communicated to the delivery port 66 of the trailer supply valve 56. The delivery port 80 of the inversion valve 76 is connected to the control port 82 of the proportioning valve 36. Inversion valve 76 is conventional, and is responsive to pressure at the control port 78 to shut off the supply port 74 and vent the delivery port 80 to atmosphere. In the absence of a pressure signal to control port 78, inversion valve 76 communicates supply port 74 with the delivery port 80.

Referring now to FIG. 2, the proportioning valve generally indicated by the numeral 36 includes a housing 84 defining a stepped bore generally indicated by the numeral 86 therein. A larger piston 88 is slidably and sealingly mounted in the stepped portions 85 and 87 of bore 86. A differential area piston 90 has a larger diameter end 92 slidably and sealingly engaged with the smaller diameter portion 89 of the bore 86. Piston 90 further includes a smaller diameter end 94 that is slidingly and sealingly received within a bore 96 defined within the piston 88. The differential area between the portions 92 and 94 of the piston 90 is vented through a vent 98 to atmosphere. A chamber 100 which receives the smaller end 102 of the piston 88. The larger end 103 of the piston 88 and the smaller diameter end of the piston 90 are exposed to the pressure level at the supply port 34. The larger diameter end 92 of the piston 90 is exposed to the fluid pressure level at the delivery port 38. The piston 90 carries a spring loaded valve 104 which is urged into sealing engagement with a valve seat 101. Valve 104 is adapted to cooperate with the valve seat 101 to control communication between the supply port 34 and the delivery port 38 and with valve seat 101 to control communication between the delivery port 38 and exhaust port 108.

In operation, when the tractor is coupled to the trailer and the supply line 68 and service line 70 are properly connected to their counterparts on the trailer, valves 52, 56 and 62 are manipulated to communicate corresponding delivery ports 58, 66 and 72 thereof with their corresponding supply ports 50, 54 and 60. Accordingly, fluid pressure is communicated from the reservoirs 12, 14 through the supply line 68 to charge the braking system on the trailer and is also communicated to the tractor parking brakes to provide hold-off pressure thereto so that the vehicle may be moved. Pressure is also communicated from the delivery port 66 of the trailer supply valve 56 to the control port 78 of the inversion valve 76. Accordingly, pressure at the control port 78 of inversion valve 76 causes the delivery port 80 thereof to be vented and shuts off the supply port 74. A service brake actuation can then be made in the normal manner by operation of the brake pedal 28 to cause the brake valve 18 to communicate the reservoir 14 with the front wheel brakes of the tractor and to communicate the reservoir 12 with the trailer service line 70 to apply the brakes on the trailer and also to communicate the service reservoir 12 with the rear tractor service brakes through the proportioning valve 36.

Referring to FIG. 2, pressure at the supply port 34, since the control port 82 is vented, causes the larger piston 88 to move downwardly viewing the Figure until the lower end 102 thereof engages the smaller piston 90, thereby also forcing it downwardly viewing the Figure to provide a relatively uninhibited flowpath between the supply port 34 and the delivery port 38 around the lip 110 of the piston 90. Accordingly, referring to FIG. 3, the rear axle proportioning valve 36 permits substantially uninhibited fluid communication between the supply port 34 and delivery port 38, as represented by line OA in FIG. 3. In other words, the fluid pressure delivered to the rear service brakes is substantially the fluid pressure at the brake valve 18.

Occasionally, the tractor must be operated without being connected to the trailer. As discussed hereinabove, the rear service brakes of the tractor are sized such that they can provide braking with a fully loaded trailer. Accordingly, when the tractor is operated without the trailer, the rear axle of the tractor is severely overbraked, thereby causing premature locking and the potential for dangerous skidding of the rear wheels. Therefore, the proportioning valve 36 has been provided to cut down the pressure level communicated to the rear wheel service brakes. When the tractor is being operated without being connected to the trailer, the trailer supply valve 56 is moved to a position closing off the supply port 54 and venting the delivery port 66 to atmosphere. Accordingly, the pressure communicated to the control port 78 of the inversion valve 76 is also vented, causing the supply port 74 thereof to communicate fluid pressure from the reservoirs 12, 14 to the delivery port 80, and therefore to the control port 82 of the proportioning valve 36.

Referring to FIG. 2, the pressure communicated to the control port 82 of the proportioning valve 36 is substantially full reservoir pressure. However, the pressure communicated to the supply port 34 by the brake valve 18 is usually much less than full reservoir pressure. In fact, communication of full reservoir pressure would occur only when the brake valve 18 is fully open such as would occur only during a panic stop. Although the pressure level at the supply port 34 tends to force the piston 88 downwardly viewing the Figure, the higher reservoir pressure at control port 82 acts in opposition to the pressure at supply port 34, so that the larger piston 88 remains in the position illustrated in FIG. 2. Accordingly, fluid pressure acting on the smaller end 94 of the smaller piston 90 causes the piston to move downwardly, viewing FIG. 2, to permit communication to the outlet port 38, but only a portion of the fluid pressure level at the inlet port 34 will be communicated to the outlet port 38, because the pressure at outlet port 38 acts against the larger effective area 92 of the piston 90. Therefore, the forces against the piston 90 will balance when the pressure level at delivery port 38 is less than the pressure level at supply port 34. Accordingly, the pressure level at delivery port 38 will be a predetermined fraction of the pressure level at the supply port 34, as is represented by line OB in FIG. 2.

As discussed above, the pressure at control port 82 is normally much higher than the pressure level at the supply port 34. However, since the pressure level at supply port 34 acts across the entire area of the piston 88, the pressure at the control port 82 acts across the area of the piston 88 less the area of the piston 88 exposed to the vented pressure in the chamber 100. Accordingly, the force due to fluid pressure in the supply port 34 will overcome the force due to fluid pressure in the control port 82 when the pressure in the supply port 34 is still less than the pressure in control port 82. When this occurs, the piston 88 moves into engagement with the piston 90, and thereafter the pistons 88 and 90 act as a single piston. Of course, the area of this single piston exposed to the pressure level in the supply port 34, which is equal to the upper end 103 of the larger piston 88, is greater than the area 92 of the piston 90 exposed to the pressure level at the delivery port 38. Accordingly, only a portion of any subsequent increase of the fluid pressure level at supply port 34 will be communicated to the delivery port 38. The point at which the larger piston 88 moves into engagement with the smaller piston 90 is represented by point B in FIG. 3, and the portion of the operation of the valve 36 in which an incremental increase in the pressure level at supply port 34 results in a greater increase than the pressure level at the delivery port 38 is represented by large segment BA in FIG. 3. At supply pressures greater than that represented by point A in FIG. 3, the valve remains fully opened. However, this high pressure, as a practical matter, rarely occurs when the vehicle is operated without the trailer.

In summary, the proportioning valve 36 is responsive to the pressure level in the trailer supply line 68 (through the inversion valve 76) to proportion fluid pressure to the rear wheel brakes of the tractor when the tractor is operated without the trailer. In this situation, the supply line 68 will be vented, because the trailer supply valve 56 must be operated to close off the trailer supply line when the tractor is operated without the trailer. However, when the tractor is pulling the trailer, the fluid pressure which charges the trailer braking system is communicated through the supply line 68. Accordingly, the proportioning valve 36 is responsive to this pressure level in the supply line 68 to permit substantially uninhibited fluid communication between the brake valve and the tractor rear service brakes. Therefore, the full effectiveness of the tractor rear service brakes is available to brake the combination vehicle when the tractor is pulling a trailer. However, since the fluid pressure level communicated to the tractor service brakes is reduced by the proportioning valve when the tractor is operated without the trailer, a dangerous overbraking condition is avoided, thereby reducing the chance of a rear wheel skid.

I claim:

1. In a fluid pressure braking system for an articulated vehicle having a towed unit and a towing unit, a source of fluid pressure carried by the towing unit, a supply line interconnecting said units for communicating fluid pressure from the towing unit to the towed unit, said supply line being maintained at a predetermined pressure level by said source when the towed unit is coupled to the towing unit and the supply line is connected to the latter, said supply line being at a pressure level less than the predetermined pressure level when the towed unit is disconnected from the towing unit and said supply line is thereby disconnected from the towed unit, said towing unit having front and rear service brakes and a service brake actuating system, characterized in that said service brake actuating system includes proportioning valve means, said proportioning valve means being responsive to the pressure level in said supply line for communicating a pressure level to said rear service brakes on the towing unit that is less than the pressure level communicated to said proportioning valve means over at least a portion of the range of actuating pressures in said service brake system when the pressure level in said supply line is below said predetermined level, said proportioning valve means communicating substantially the same pressure level to said rear service brakes as is the pressure level communicated to said proportioning valve when the pressure level in said supply line is above said predetermined level, whereby a proportioned brake pressure level is communicated to said rear service brakes when the towing unit is disconnected from the towed unit and an unproportioned brake pressure level is communicated to said rear service brakes when the towed unit is connected to the towing unit, said proportioning valve means including a housing having a control port, an inlet port, and an outlet port, and valve mechanism for controlling communication between the inlet and the outlet ports, said valve mechanism being responsive to the pressure level at said control port to proportion communication between the inlet and outlet port over at least a portion of the range of actuating pressures, said braking system further including an inversion valve having a first port connected to said fluid pressure source, a second port connected to said control port of the proportioning valve, and a third port connected to said supply line, said inversion valve including means responsive to the pressure level at said third port to open communication between the first and second ports when the pressure at the third port is below a predetermined value and to vent said second port when the pressure level is above said predetermined value.

2. The braking system of claim 1, characterized in that said valve mechanism includes a valve element and differential area piston movable toward and away from sealing engagement with the valve element, said differential area piston having a larger effective area exposed to the fluid pressure level at said outlet port and a smaller effective area exposed to the fluid pressure at said inlet port, and stop means responsive to the pressure level at said control port to hold the differential area piston away from sealing engagement with said valve element when said control port is vented, said stop means permitting said differential area piston to cooperate with the valve element to proportion communication between the inlet and outlet port when a pressure signal is communicated to said control port through said inversion valve.

* * * * *